Feb. 13, 1968   A. C. MUELLER   3,368,863
MOTION PICTURE CAMERA
Filed July 6, 1964   2 Sheets-Sheet 1

INVENTOR.
Arthur C. Mueller
BY Barry L. Clark
John E. Peele Jr.
Attys

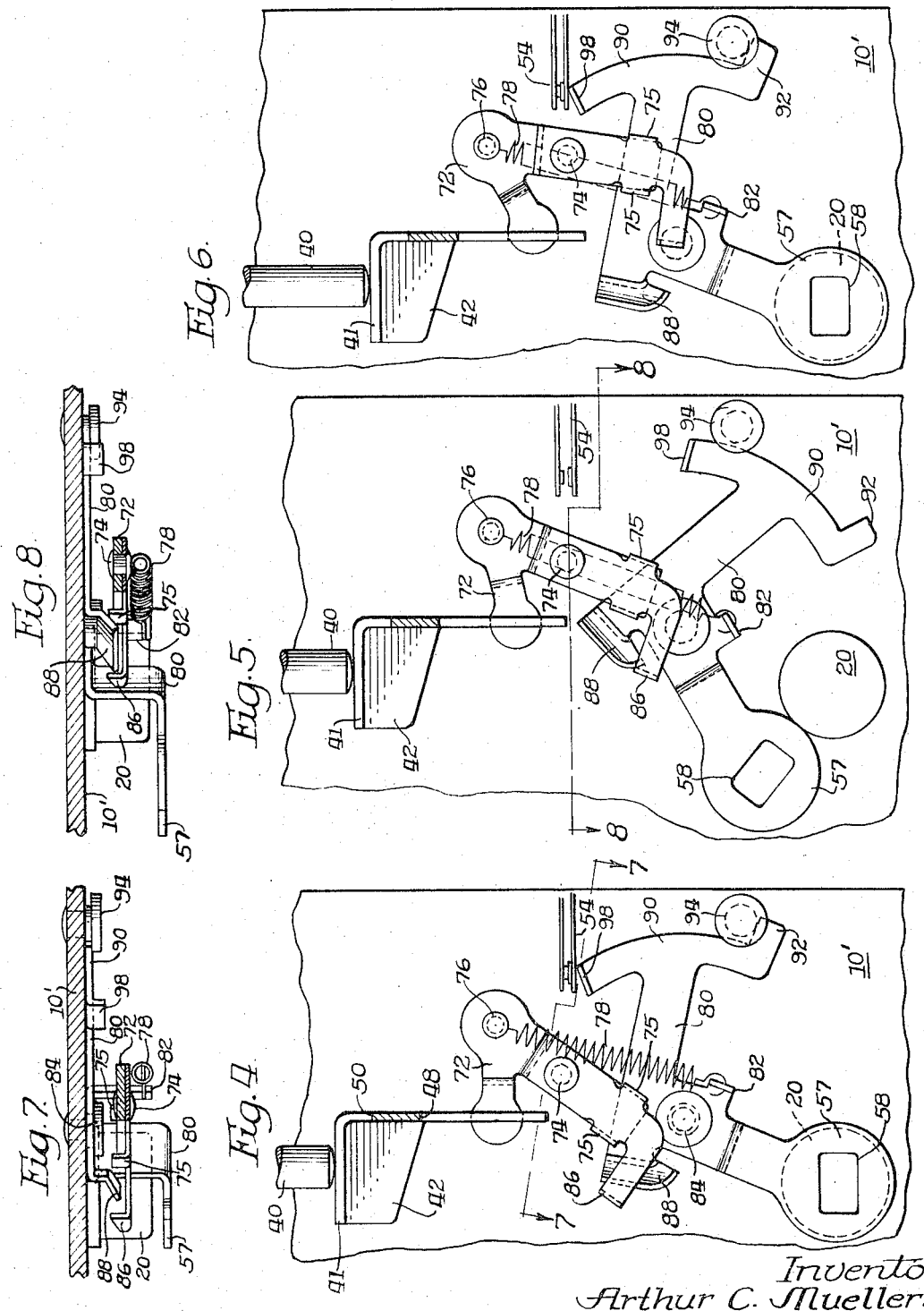

United States Patent Office 3,368,863
Patented Feb. 13, 1968

3,368,863
MOTION PICTURE CAMERA
Arthur C. Mueller, Chicago, Ill., assignor to Bell & Howell Company, Chicago, Ill., a corporation of Illinois
Filed July 6, 1964, Ser. No. 380,391
12 Claims. (Cl. 352—141)

ABSTRACT OF THE DISCLOSURE

In a multiple speed camera having a behind the diaphragm light sensing element, a mask is selectively positionable in the light path to that element only when the quantity of light to that element is to be reduced by a discrete amount as when the operating speed of the camera is increased.

---

The present invention relates to a camera, and particularly to a multi-speed motion picture camera having an automatic exposure control system including a light sensitive element before which a compensation mask controlled by the camera starting button is introduced at selected times.

It is well known that the effective quantity of light reflected from the optical path of a camera by a reflecting shutter to a light sensitive element located behind the diaphragm of the camera is decreased when the shutter is operating to about half the quantity when the shutter is not operating. Further, the exposure control system is not self correcting for changes in the number of frames per second to be exposed, having been initially adjusted for operation at a normal number of frames per second. The effective quantity of light reaching the film in the camera, when the shutter and drive are operating at a speed approximately double the normal speed to expose frames of film at a rate which when projected will appear as what is commonly described as "slow motion," is decreased to about half the quantity of light reaching the film when the shutter and drive are operating at a normal speed. Thus, the effective quantity of light to the light sensitive element or photoresistor should be modified to cause the exposure control system to accurately adjust the diaphragm of the camera to properly expose each frame of film with respect to the light reflected from the scene to be photographed.

The present inventive concept provides a compensation mask which is automatically introduced into the path of the light rays falling on the light sensitive element when the camera drive operation is stopped and when the drive is being operated at the "slow motion" speed. The mask is proportioned to reduce the effective quantity of light rays reaching the light sensitive element by approximately 50% to compensate for the inability of the light sensitive element to automatically adjust for changed conditions.

An important object of the invention is to provide a compensation mask to automatically but selectively restrict the quantity of light striking the surface of a behind-the-diaphragm light sensitive element of a motion picture camera when a manually actuatable camera start button is in selected positions.

Another object of the invention is to provide a compensaton mask for automatic placement before a behind-the-diaphragm light sensitive element in the light path thereto, which mask reduces the light to the light sensitive element when the shutter is operating at a speed approximately double the normal rate.

Further objects of the invention will appear from the description as hereinafter set forth in connection with the specification including the accompanying drawings wherein:

FIGURES 4–6 are enlarged views of the mask assembly in several positions.

FIGURE 7 is a sectional view taken along line 7—7 of FIGURE 4.

FIGURE 8 is a sectional view taken along line 8—8 of FIGURE 5.

Figure 1:
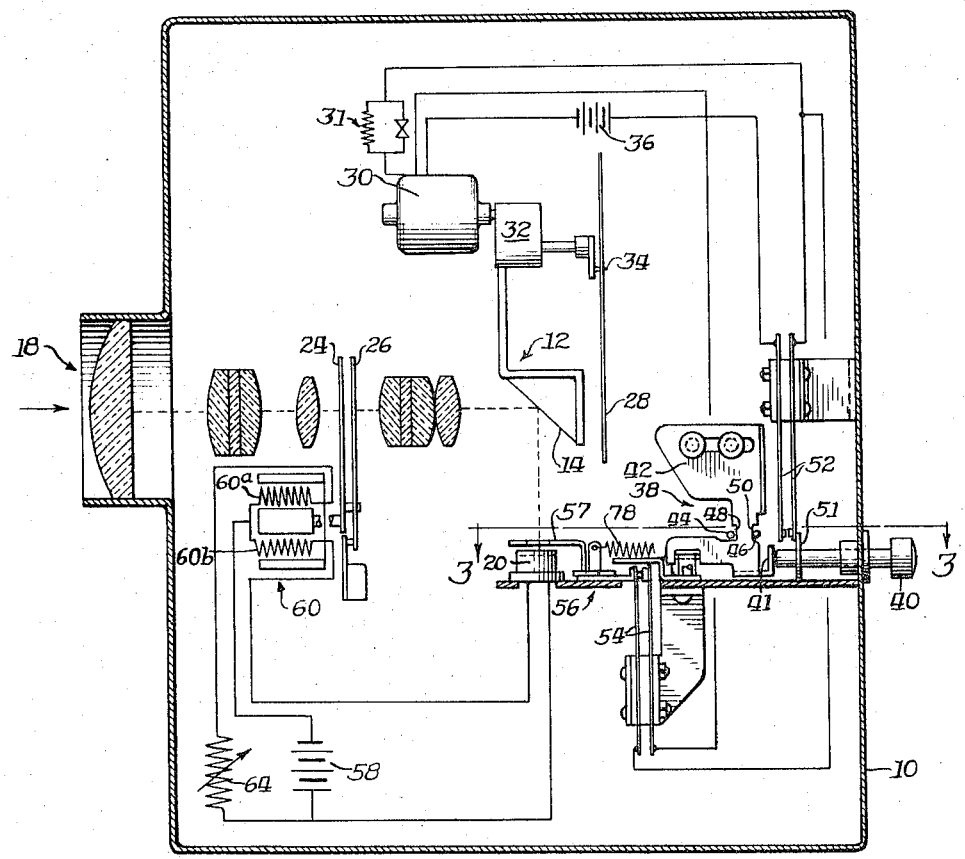
FIGURE 1 is a schematic view of some of the elements and controls of a camera as applicable to an exposure control system incorporating a compensation mask of the present invention.

In FIGURE 1 is schematically disclosed a typical motion picture camera having a housing 10 in which a shutter 12 having a reflecting surface 14 on the light interrupting sector thereof reflects the light rays passing through an objective 18, composed of several lens elements, to a light sensitive element 20 located behind diaphragm blades 24, 26 and mounted either on housing 10 or a frame portion 10′ thereof. When the reflecting surfaced interrupting sector is not in the light path from the objective, the light rays impinge upon film 28 to expose same. Shutter 12 is disclosed as being of the rectilinearly reciprocating type powered by a multi-speed camera drive motor 30 through appropriate known motion conversion and transmission elements 32 which are further connected to operate shuttle tooth 34 to intermittently move film 28 in the usual manner. Motor 30 is electrically powered from a source, such as battery 36, and is controlled in terms of frames per second operation, by a built-in governor (shown as 31) which when in the camera drive control circuit limits the shutter and other drive operations to a normal or governed number of frames per second and when out of the circuit permits the operations to reach the maximum number of frames per second for which the motor is designed when powered by the available power source, i.e., ungoverned or slow motion speed.

A camera control assembly includes a start button 40 engaging a shelf 41 of an actuation link 42. When the button is manually actuated to a selected "run" position, it is biased to be returned to a normal "off" position through cooperation between the link 42 and a pair of spring arms 44, 46. Each of the arms respectively engages one of a pair of notch surfaces 48, 50 in opposed sides of link 42 when the link is moved from its normally off position. Further included in the assembly are switch sets 52, 54 which are mounted to selectively open and close circuits between battery 36, motor 32 and governor 31 as the start button is shifted from the off to run positions. Other mechanical connections cooperate with link member 42 upon actuation of start button 40 to cause actuation of a compensation mask assembly 56 having a mask portion 57 which is interposable before photoresistor 20 in the light path thereto.

Referring particularly to the camera drive control circuit, when the camera is actuated from its off condition to normal running operation by depression of start button 40 inwardly relative to housing 10, a pusher disc 51 on the start button engages one contact element of the switch set 52 to move or push same into engagement with a cooperating contact element to complete the power circuit between motor 30 and battery 36 to cause the motor to be operated at a governed speed since governor 31 is always operative except when bypassed with completion of the circuit through switch set 54. Further depression of start button 40 maintains the power circuit and additionally causes a mechanical linkage, including the mask assembly to close the governor circuit by closing the contacts of switch set 54 to bypass the governor and permit the motor to operate at is ungoverned speed.

Figure 2:
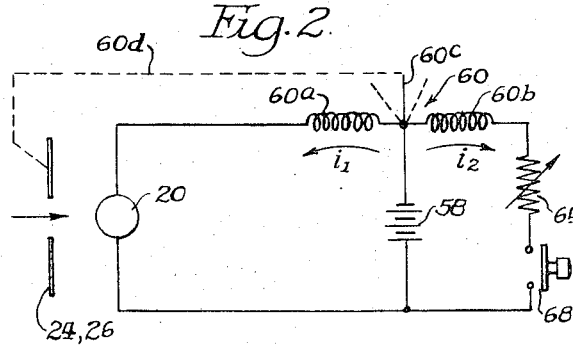
FIGURE 2 is a circuit diagram of the exposure control system.
Figure 3:
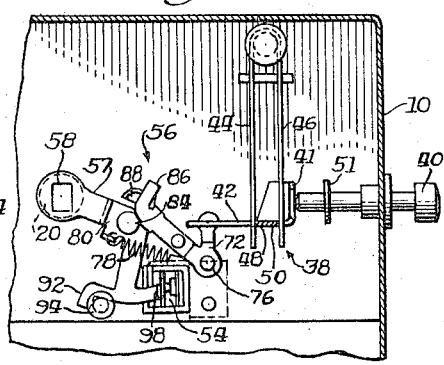
FIGURE 3 is a view of the mask and control assembly taken along line 3—3 of FIGURE 1.

An exposure control circuit, as disclosed in FIGURES 1 and 2, includes a photoresistor 20, a battery 58, a galvanometer 60 of the center tapped coil, weak spring variety to which the diaphragm blades 24, 26 are operatively connected, a trimming resistor 64 and a switch 68 operable in a known manner by start button 40. The circuit is composed of a variable loop and a reference loop connected through a common current source or battery 58. The current flowing from the battery through the variable loop is caused to change by variations in the resistance of the photoresistor as various quantities of light impinge thereon. As the current $i_1$, reduced by the resistance of photoresistor 20 flows through coil portion 60a, the diaphragm blades 24, 26 (indicated in FIGURE 2 by movable element 60c connected to the diaphragm blades through a galvanometer-blade coupling 60d) are varied until the resistance in the variable loop balances with the resistance of the reference loop. The resistance in the reference loop is determined by the adjustment of the trimming resistor 64, e.g., in accordance with the film speed, to control the current $i_2$ flowing through the other coil portion 60b. It is understood that the blades are opened or closed as a result of the comparative strengths of current $i_1$ and current $i_2$ when the resistance of the photoresistor varies as a result of the quantity of light impinging thereon as controlled by the diaphragm blade opening.

With particular reference to the compensation mask assembly 56, as shown in FIGURES 3–8, the actuator link 42, which may either be actuated directly by start button 40 or connected thereto through other linkage elements, is connected for longitudinal motion so as to rotate a bell crank member 72 about a pivot axis aligned with a pin 76. Attached to the pin 76 mounted on the bell crank is a spring member 78, the other end of which is attached to the compensation mask support plate 80 through a lug member 82 bent at an angle to the support plate. The spring causes the support plate to be rotatably biased in a counter-clockwise direction relative to the support plate pivot axis through shoulder rivet 84 relative to bell crank member 72 which is biased thereby in a clockwise, over-center manner about a pivot axis through pin 76.

Support plate 80 includes an extension forming an apertured mask portion 57 shaped substantially as photoresistor 20 with which it is to be used. The opening 58 therein is selected such that the light rays impinging upon the photoresistor are reduced by approximately 50%. Further, the plate includes another extension forming an arcuate arm 90 from which extends a stop engaging portion 92 which is movable into contact with a stop 94 mounted in a frame portion 10' of camera housing 10. When the stop engaging portion 92 is in contact with stop 94, the mask opening 58 is located in alignment with the light path to the photoresistor 20 to reduce the quantity of light rays thereto and an upright lug 98 on the other end of arm 90 engages switch set 54 so as to close same.

The bell crank 72, of relatively rigid construction has a slightly flexible cam engaging leg 86 attached thereto by a rivet 74 and maintained in alignment with an arm of the crank by lugs 75 which extend along the sides of the arm so as to insure that the flexible leg is rotated with the crank, yet to permit the leg to be lifted away from the crank when flexing over the edge of cam portion 88. The cam engaging leg is free of engagement with cam portion 88 of plate 80 when the link member 42 and the bell crank are in "off" conditions. However, when the link member is moved by actuation of start button 40 to its normal governed run position, bell crank 72 is rotated counter-clockwise (from the position as seen in FIGURE 4) and the cam engaging leg 86 moves into engagement with cam portion 88 to rotate the plate 80 (clockwise around axis 84) against the biasing of spring 78 until the mask portion 57 clears the light path to photoresistor 20. Mask portion 57 remains clear until the position of bell crank 72 is again changed by further depression or release of start button 40. The further depression to an ungoverned run position causes additional movement of actuator link 42 and therefore additional counter-clockwise rotation of bell crank 72 such that the cam engaging leg 86 is moved further over the peripheral surface of cam portion 88 until out of engagement therewith, thus permitting bell crank 72 to snap overcenter and release plate 80 to enable spring 78 to return the plate to its initial position with mask 57 over the photoresistor (as seen in FIGURE 6).

When start button 40 is released from its normal run position to return to its off position, the force of spring 78 urges bell crank 72 clockwise around pivot axis 76 and thus causes the flexible leg to be moved back to its initial position by riding down the surface of cam 88 and releasing the plate. Similarly, when the start button is released from the ungoverned run position to return to its off position, the bell crank rotates clockwise and the cam engaging leg flexes up and over the edge of cam portion 88 and out of engagement therewith, such that plate 80 remains in position with mask portion 57 in the light path to the photoresistor.

As previously indicated, the normally open switch set 54, as seen in FIGURES 4–6, is connected to the governor 31 of camera drive motor 30 as seen in FIGURE 1 and is positioned to be closed by the end lug 98 of arm 90 only when the mask is in position over the photoresistor. Closing of the contacts of the switch set bypasses the governor circuit permitting the motor to operate at an ungoverned rate. Although the governor circuit is closed when start button 40 is released and the contacts are closed, the camera "Operation" is unaffected since the power circuit through switch set 52 is open and therefore the motor is inoperative.

In summary, the camera operation is controlled by manually moving start button 40 from a normally off position to either a normal run or slow motion run position. When the button is moved to the run position, the compensation mask is moved out of the light path to the light sensitive element and the governor circuit is opened such that the camera drive will operate at a normal number of frames per second. Similarly, when the button is moved to slow motion position, the mask is repositioned before the light sensitive element and the governor circuit is closed to allow the camera drive to operate at an ungoverned speed.

In the instant specification, certain preferred embodiments relating to a compensation mask for use relative to a light sensitive element have been described; however, they are not intended to limit the invention to the details set forth with respect thereto, since modifications may be made without departing from the spirit of the invention as defined in the claims.

I claim as my invention:

1. In a motion picture camera having a diaphragm means and a light sensitive element behind the diaphragm means adapted to receive light rays from a reflecting shutter, the improvement comprising drive control means adapted to be moved to cause the camera drive to operate at a normal speed and a second speed, mask means to reduce the quantity of light reaching the light sensitive element, said mask means being movable into and out of the light path to the light sensitive element intermediate said diaphragm means and said light sensitive element, and means connecting said drive control means and said mask means to selectively move said mask means before said light sensitive element when the camera drive is actuated to operate at said second predetermined speed by said drive control means.

2. In a motion picture camera having a diaphragm, photoresistor means behind the diaphragm means on which light rays impinge from an objective substantially before the diaphragm means as reflected to said photoresistor means by a reflecting shutter, the combination with camera drive means operable at governed speed and an ungoverned speed, of means to actuate said camera drive means, said actuation means being selectively positionable to a non-running position, a governed speed running position, and an ungoverned speed running position, mask selectively interposable in the light path to the photoresistor means to reduce the quantity of light reaching said photoresistor means, and means connecting said actuation means and said mask means to interpose said mask means in said light path when said actuation means is in said non-running position and in said ungoverned speed running position.

3. In a motion picture camera including a housing having a diaphragm and an adjustable multiple speed camera drive, the combination with a behind-the-diaphragm photoresistor onto which light rays are reflected by a reflecting shutter intermittently movable in the path of the light rays from an objective, of camera drive actuation means selectively movable to several positions to actuate said camera drive at a normal rate or a slow motion rate, plate means including a mask means adapted to be interposed before the photoresistor in the light path thereto to reduce the qauntity of light to said photoresistor, a stop member fixed to said housing, said plate means including a stop engaging portion adapted to engage said stop member, and means connecting said actuation means and said plate means, said connecting means including a bell crank member adapted to be rotated about a pivot axis by movement of said actuation means wherein said stop engaging portion of said plate means is moved away from said stop member permitting said mask means to be moved from said light path to the photoresistor when said actuation means is in said position to operate said camera drive at a normal rate.

4. In a motion picture camera including a housing, a diaphragm and a multiple speed camera drive adapted to be operated at predetermined rates in said housing, and an objective through which light rays pass into said housing, the combination with a behind-the-diaphragm photoresistor on which light rays are reflected by a reflecting shutter intermittently movable in the path of light rays from the objective, of camera drive actuation means selectively movable to one of several conditions to actuate said camera drive at one of its predetermined rates, said actuation means including a start button, a link member, a bell crank member and a resilient member, said start button being adapted to move said link member to rotate said bell crank member against the urging of said resilient member when the start button is moved to a selected position, and mask means adapted to be interposed before the photoresistor in the light path thereto to reduce the quantity of light to said photoresistor, said mask means being connected to said actuation means so as to be moved into said light path before said photoresistor when said actuation means is in one of said selected positions.

5. In a motion picture camera as in claim 4, a stop member fixed to said housing, said interposable mask means including a stop engaging portion adapted to engage said stop member wherein when said stop engaging portion is moved away from said stop member as said actuation means actuates said camera drive at one of said selected speeds, said mask means is moved from said path of light rays to the photoresistor.

6. A motion picture camera as in claim 4, in which the start button is movable from a normally off position to a normal speed position and to a slow motion speed position, and in which the mask is interposed before the photoresistor in the normally off position and in the slow motion speed position.

7. In a motion picture camera having an objective, a diaphragm means, a light sensitive element behind the diaphragm means accepting light rays from the objective substantially before the diaphragm means as reflected to said element by a reflecting shutter, the combination with a multiple speed camera drive, of actuation means adapted to be moved selectively to actuate said camera drive to operate at a selected speed, bell crank means adapted to be rotated by said actuation means when said last named means is moved to actuate said drive to one speed, a flexible leg on said bell crank means, and pivotable plate means including a mask means and a cam means, said plate means being positioned relative to said bell crank means, said mask means being normally positioned before said light sensitive element to reduce said light rays thereto, said leg of said bell crank means engaging said cam means to rotate said mask means from before said light sensitive element.

8. In a motion picture camera having an objective, a diaphragm means, a light sensitive element behind the diaphragm means accepting light rays from an objective substantially before the diaphragm means as reflected to said element by a reflecting shutter, in combination: a camera drive having a first and second speed; actuation means adapted to be moved selectively to actuate said camera drive to operate at a selected speed; bell crank means adapted to be rotated by said actuation means when said last named means is moved to actuate said drive to a first speed and to be further rotated to actuate said drive to a second speed; a flexible leg on said bell crank means; and a pivotable plate means including cam means and mask means, said plate means being adjacent said bell crank means, said mask means normally reducing light rays to said light sensitive element; said flexible leg being moved into engagement with said cam means when said actuation means rotates said bell crank when actuating said drive to said first speed and being moved out of engagement with said cam means when said actuation means further rotates said bell crank means when actuating said drive to said second speed.

9. In a motion pitcture camera having an objective, a diaphragm means, a light sensitive element behind the diaphragm means accepting light rays from an objective substantially before the diaphragm means as reflected to said element by a reflecting shutter, the combination with a camera drive adapted to be operated at a first speed and a second speed, of actuation means adapted to be moved from a first position to a second position to actuate said camera drive at said first speed and to be moved to a third position to actuate said camera drive at said second speed, bell crank means adapted to be rotated by the said actuation means when said means is moved, pivotable plate means adjacent said bell crank means, including a mask means and cam means, resilient means connected to said plate to urge said mask means of the plate to reduce light rays to said light sensitive element, and a flexible leg on said bell crank means, said flexible leg being moved into engagement with said cam means to rotate said plate means against the urging of said resilient means when said actuation means is in said second position and to permit said plate means to be rotated by the urging of said plate means when said actuation means is in said third position.

10. An improvement in a motion picture camera having a light sensitive element, the improvement comprising: a camera drive having a first and second speed; actuation means adapted to be moved selectively to actuate said camera drive to operate at a selected speed; bell crank means adapted to be rotated by said actuation means when said last named means is moved to actuate said drive to a first speed and to be further rotated to actuate said drive to a second speed; a flexible leg on said bell crank means; and a pivotable plate means engageable by said bell crank means and including a cam means and a mask means adapted to be selectively interposed to block the perimeter of said light sensitive element to reduce the quantity of light rays to said element; whereby said flexible leg is moved into engagement with said cam means when said actuation means rotates said bell crank and thereby moves said mask means from before said light sensitive element when actuating said drive to said first speed and said flexible leg is moved out of engagement with said cam means when said actuation means further rotates said bell crank means and thereby releases said mask means to return to a position before said light sensitive element when actuating said drive to said second speed.

11. An improvement in a motion picture camera having a light sensitive element, the improvement comprising: a camera drive adapted to be operated at a first speed and a second speed; actuation means adapted to be moved from a first position to a second position to actuate said camera drive at said first speed and to be moved to a third position to actuate said camera drive at said second speed; bell crank means adapted to be rotated by the said actuation means when said means is moved; pivotable plate means adjacent said bell crank means, including a mask means adapted to be positioned to block the perimeter of said light sensitive element to reduce the light rays thereto, and a cam means; resilient means connected to said plate to urge said mask means of the plate to a blocking position; and a flexible leg on said bell crank means, wherein said flexible leg is movable into engagement with said cam means to rotate said plate means against the urging of said resilient means when said actuation means is in said second position and to permit said plate means to be rotated to a non-blocking position by the urging of said plate means when said actuation means is in said third position.

12. In a motion picture camera including at least a two speed camera drive, one of which speeds is controlled through a governor circuit, a housing, an objective and a diaphragm interior of said housing and behind a substantial portion of said objective, said camera having a behind-the-diaphragm light sensitive element on which light rays impinge from the objective as reflected thereto by a reflecting shutter, in combination: means to selectively actuate said camera drive to the governed or ungoverned speed, mask means adapted to be interposed after the diaphragm and before the element in the light path thereto to reduce the quantity of light to said element, means operable when said mask means is moved into said light path to cause said drive means to operate in said ungoverned speed.

References Cited

UNITED STATES PATENTS

| | | | |
|---|---|---|---|
| 3,046,834 | 7/1962 | Ferrari et al. | 352—182 |
| 3,128,669 | 4/1964 | Steisslinger | 352—141 |
| 3,177,497 | 4/1965 | Richartz | 352—141 |

FOREIGN PATENTS 291,533    9/1953    Switzerland.

JULIA E. COINER, *Primary Examiner.*

NORTON ANSHER, *Examiner.*

H. H. FLANDERS, *Assistant Examiner.*